United States Patent

Chaplin

[15] 3,706,185
[45] Dec. 19, 1972

[54] APPARATUS FOR REMOVING MARINE GROWTHS AND ROOTS

[72] Inventor: Merle P. Chaplin, 609 Driver Avenue, Winter Park, Fla. 32789

[22] Filed: June 23, 1970

[21] Appl. No.: 59,830

Related U.S. Application Data

[62] Division of Ser. No. 764,586, Oct. 2, 1968, Pat. No. 3,540,194.

[52] U.S. Cl. ..................................................56/9
[51] Int. Cl. ..............................................A01d 45/08
[58] Field of Search ............56/1, 8, 9; 299/9, 16, 17; 37/54, 55, 78, 195, 62

[56] References Cited

UNITED STATES PATENTS

| | | | |
|---|---|---|---|
| 1,415,113 | 5/1922 | Phillips, Jr. | 56/9 UX |
| 95,213 | 9/1869 | Elliott | 37/78 |
| 3,477,213 | 11/1969 | Just et al. | 56/9 |

*Primary Examiner*—Louis G. Mancene
*Assistant Examiner*—J. A. Oliff
*Attorney*—Julian C. Renfro

[57] ABSTRACT

Apparatus for removing weeds and plants from the bottoms of lakes and waterways, involving injecting water and subsequently compressed air directly below the root systems of such plants, thus forcing them away from the bottom of the lake or waterway. A preferred embodiment of my invention involves a conveyor utilized in concert with this fluid pressure injection, which enables the removed plants to be carried to the surface of the water and disposed of, instead of leaving portions of the uprooted plants in the water to decay.

10 Claims, 14 Drawing Figures

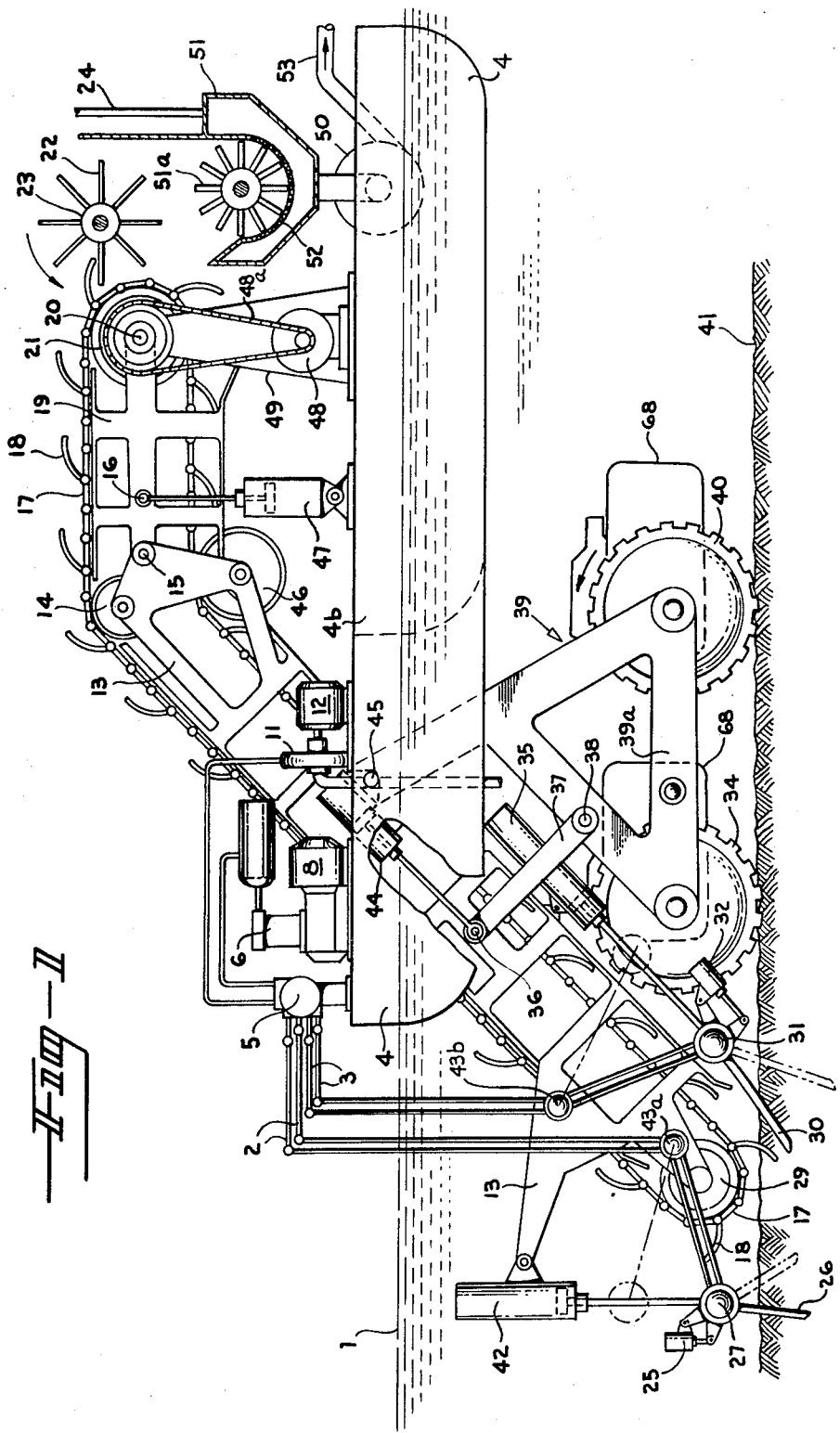

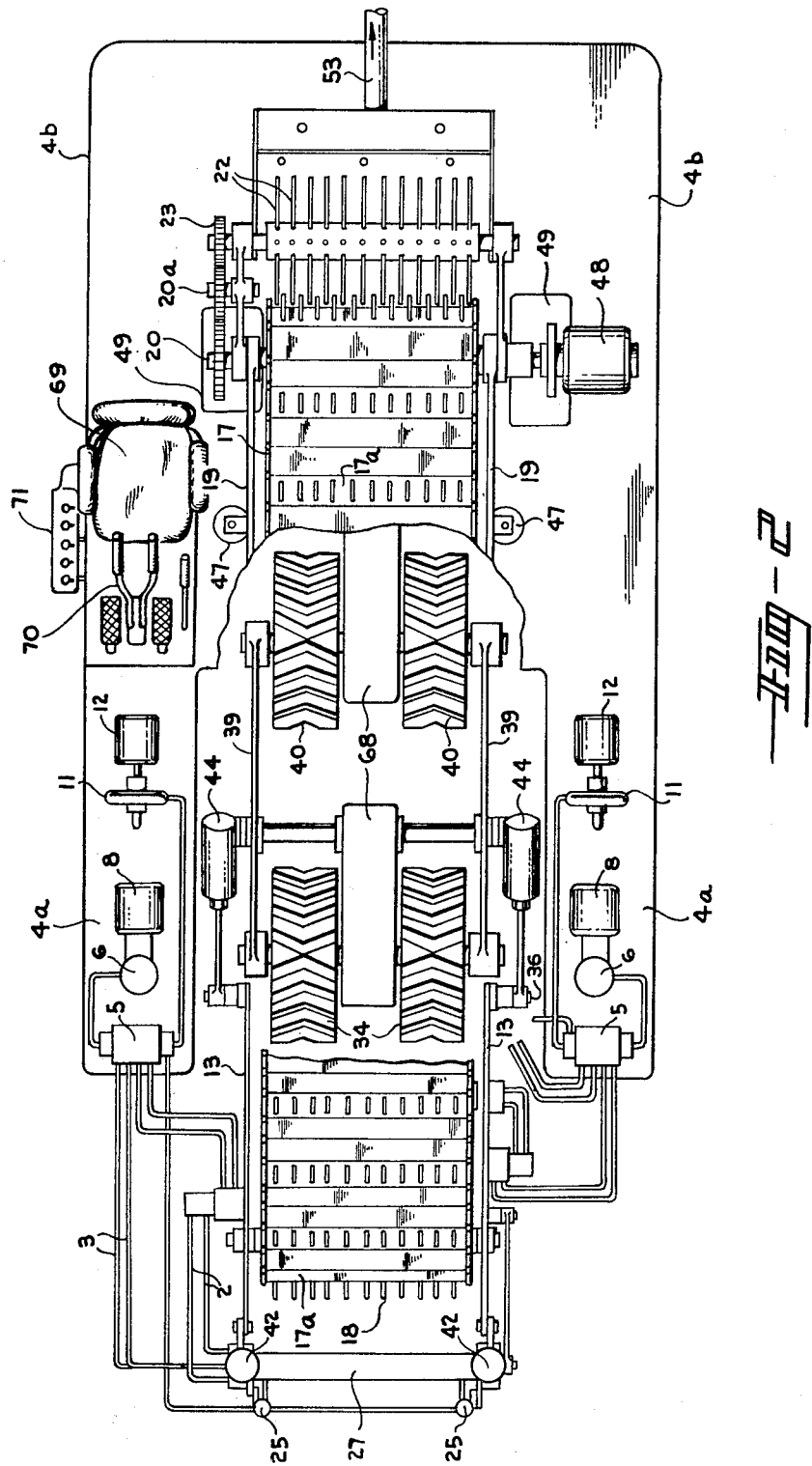

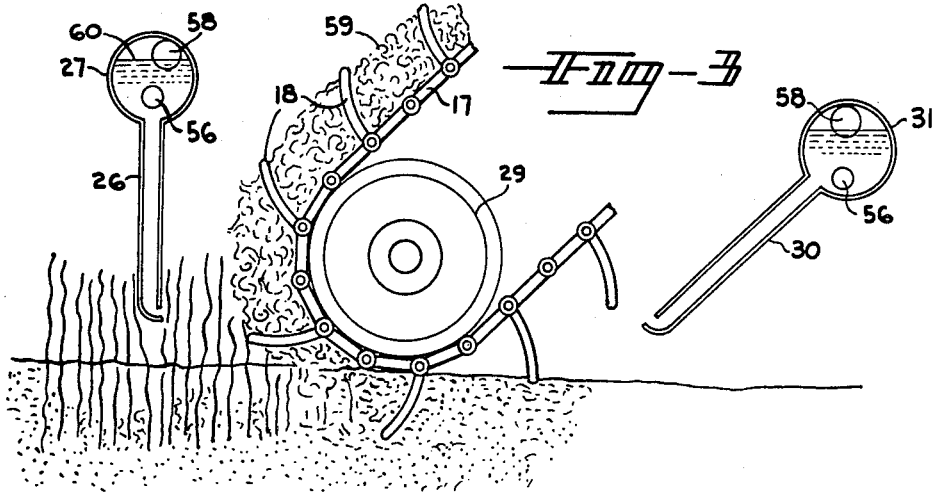
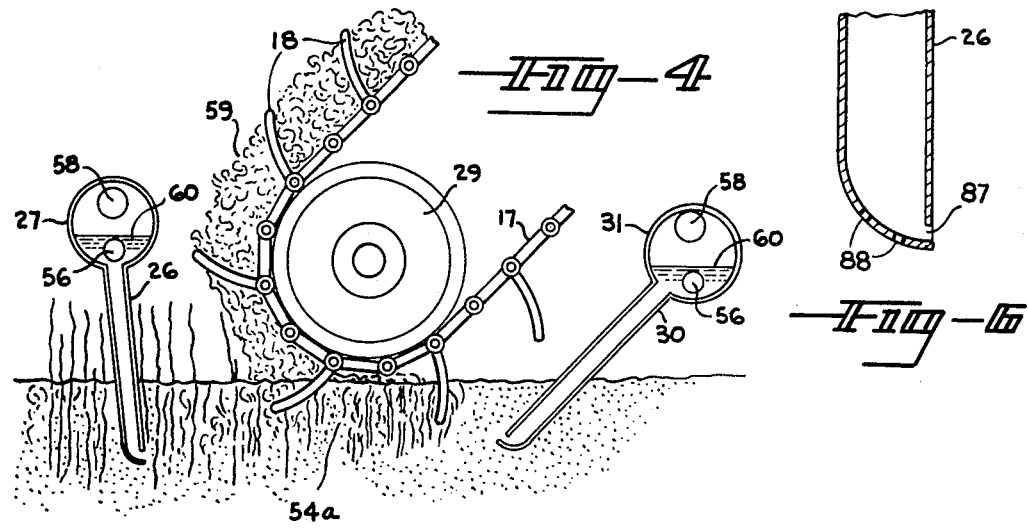
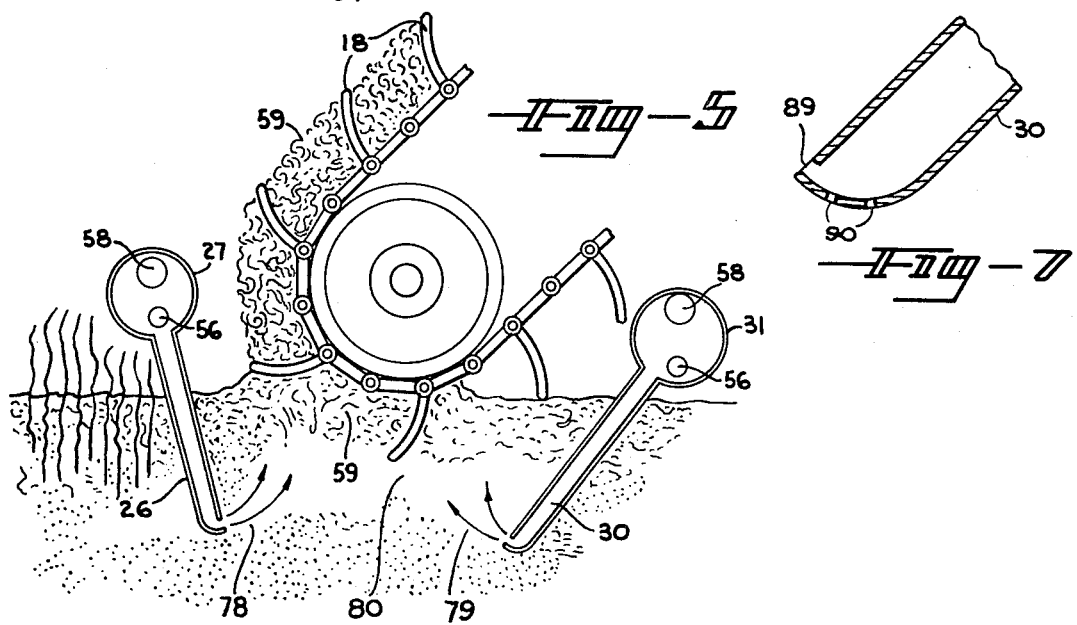

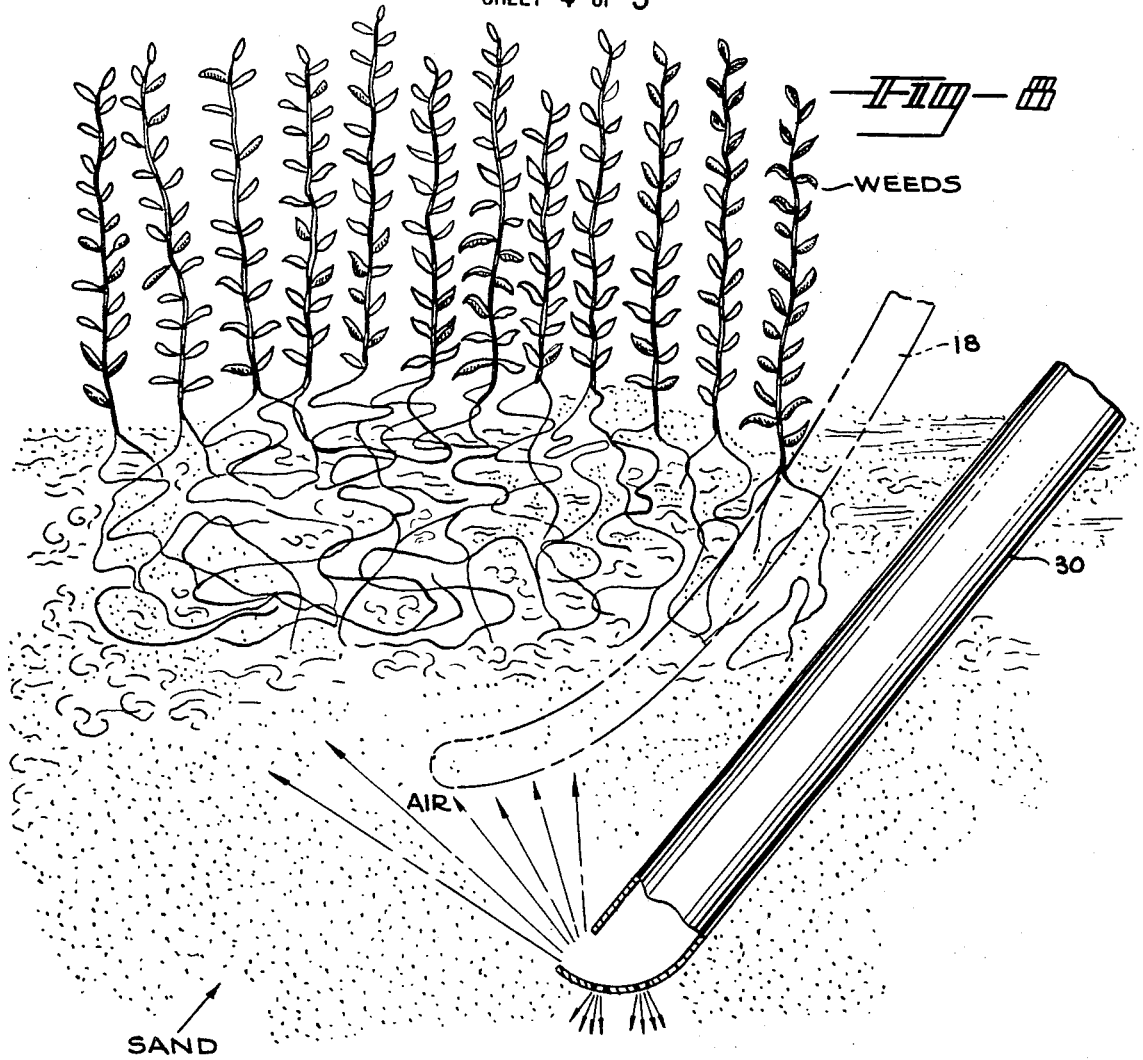
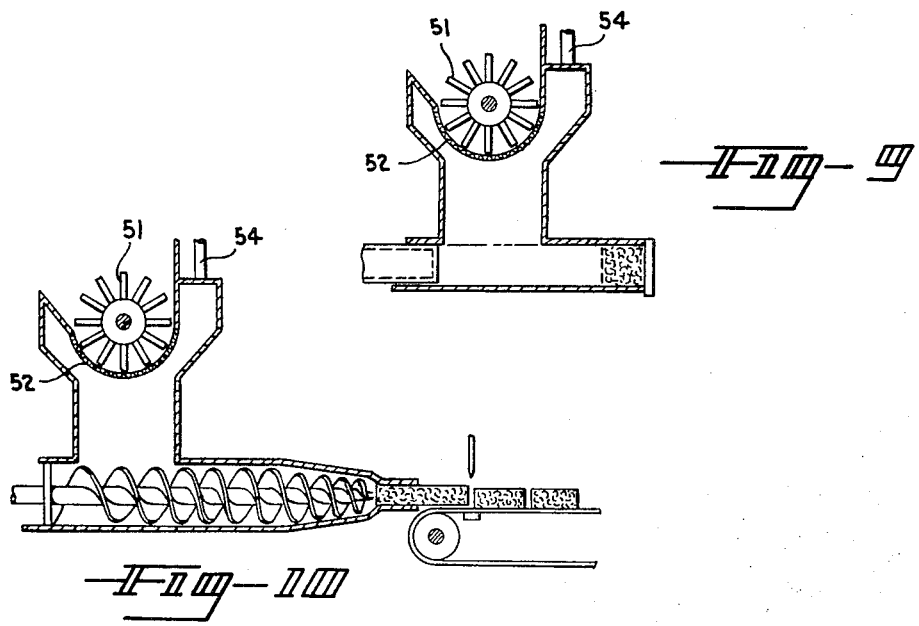

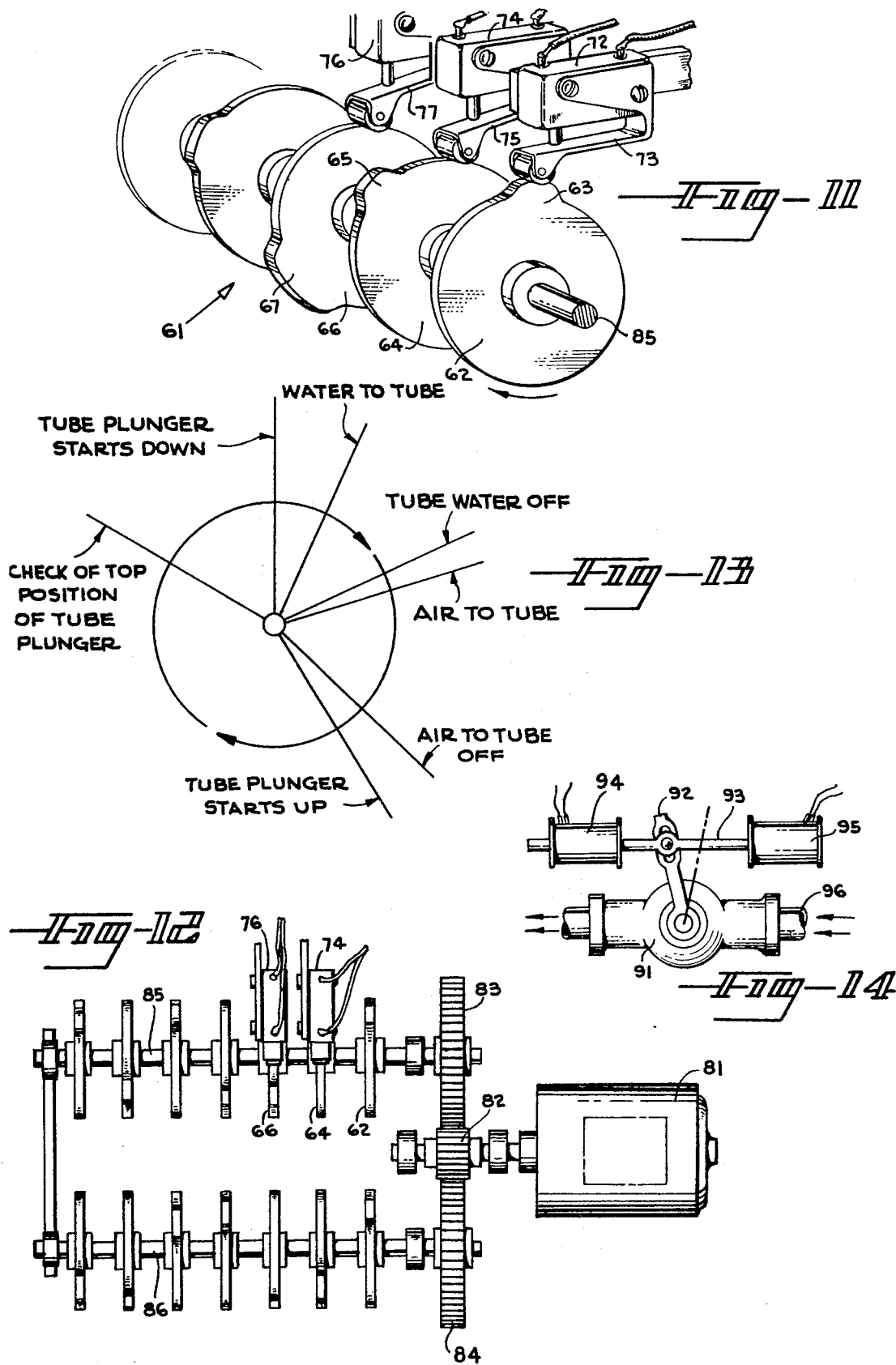

APPARATUS FOR REMOVING MARINE GROWTHS AND ROOTS

This is a division of application Ser. No. 764,586, filed Oct. 2, 1968 now U.S. Pat. No. 3,540,194, Nov. 11, 1970.

CROSS REFERENCE TO RELATED APPLICATION

This invention bears a relationship to my co-pending application entitled "Method and Apparatus for Cleaning Areas Overlain by a Water Body", Ser. No. 666,090, filed Sept. 7, 1967, now U.S. Pat. No. 3,412,862. That application is concerned with a method and apparatus for cleaning a water covered sand bottom basin of silt and other deposits, utilizing a housing movable along the bottom of the basin, which housing containing jets for forcing fluid under pressure so as to entrain deposited material, and which utilizes suction means for bringing material other than sand to the surface.

That application disclosed effective means for dislodging small surface weeds, but where the deposit of silt, dirt and similar material had been allowed to accumulate on the lake bottom for a considerable period of time, the marine root growths will have become too well established to be readily or completely removed by mechanical methods.

BACKGROUND OF THE INVENTION

1. Field of the Invention

This invention can be categorized with the class of device concerned with the removal of weeds and other undesirable plant life from the bottom of rivers, harbors, lakes and waterways by the use of jets of water.

2. Description of the Prior Art

The prior art may be categorized in some six categories, these being as follows:

Group 1, removing of marine growths, grass and reeds by cutting and raking. This grouping includes patents classified in Class 56, subclasses 8, 9, 10, 23 and 328.

Group 2, removing marine growths, grass and reeds with water jets, with or without suction. This grouping includes patents classified in Class 56, subclass 9, and Class 37, subclasses 54 and 78.

Group 3, cleaning sludge basins and suction dredging. This grouping includes patents classified in Class 37, subclasses 62 and 63, as well as Class 136, subclass 150, and Class 210, subclass 198.

Group 4, cleaning sand filters. This grouping includes patents classified in Class 210, subclasses 241, 271 and 273.

Group 5, cranberry harvesting. This grouping includes patents classified in Class 56, subclasses 8 and 330.

Group 6, shell fish dredging and particulate dredging. This grouping includes patents classified in Class 37, subclasses 57, 61 and 195, and Class 119, subclass 42.

However, no known reference has proven satisfactory for removing entire plants, including their root systems, and disposing of same at a remote location.

SUMMARY OF THE INVENTION

This invention involves a novel method for removing marine growths and their roots utilizing pressure means that first injects water and thereafter air directly below the root systems of the plants. The apparatus making this possible typically involves the use of timed means for successively implanting a plurality of tubes into the bottom of the lake, basin or other body of water so that pressure means can be used to force or lift the plant life from the bottom. A conveyor apparatus may be used in concert with the fluid pressure apparatus for bringing the removed weeds to the surface for disposal.

An exemplary version of my device involves a floating barge, below the front end of which a wheeled device known as a traveler is adapted to move along the bottom of the lake or basin.

Connected between the barge and the traveler is an inclined, pivotally mounted conveyor, around peripheral portions of which a chain equipped with numerous teeth may travel. The lowermost end of the conveyor may be adjustably positioned by an operator on the barge to engage the bottom of the lake or basin in the optimum relationship to the injector apparatus in order to carry to the surface the weeds and plants removed by my novel fluid pressure injector means. In addition to adjusting the relationship of the conveyor to the injector means, the operator can also adjust or proportion the weight carried by the traveler and the barge so that the traveler will have sufficient traction to move along the bottom of the lake or basin, but on the other hand not carry so much weight as to cause it to become mired.

It is therefore a principal object of my invention to provide a novel fluid pressure injection arrangement for separating the roots of plants and weeds from the bottom of lakes and waterways.

Another object of my invention is to provide a novel sequence of operation whereby water and then air are injected under pressure directly below or under the root systems of offending marine plants and weeds.

Still another object of my invention is to provide a novel method for utilizing fluid pressure techniques for separating the roots of plants from the bottom of a basin of water, and thereafter utilizing closely adjacent mechanical means for carrying the removed plants to the surface for disposal.

Yet another object of my invention is to provide a novel apparatus for successively implanting pressure injection means along the bottom of a lake or waterway so as to clear growth from a large area of bottom, such implanting taking place in accordance with a preestablished sequence under the control of an operator.

Yet still another object of my invention is to provide an apparatus for accomplishing the just mentioned successive implantations of pressure nozzles, in concert with means for entirely removing the offending growth from the lake.

These and other objects, features and advantages of my invention will be more apparent from a study of the appended drawings in which:

FIG. 1 is a side elevational view of my novel apparatus including barge, traveler and conveyor, with certain portions in section to reveal internal construction;

FIG. 2 is a plan view generally along the lines of the apparatus shown in FIG. 1, with certain portions removed to reveal the propulsion arrangement provided by the traveler;

FIGS. 3, 4 and 5 represent related views to a scale sufficiently large as to reveal the succession of steps involved in implanting my novel fluid pressure means in the bottom of the lake or basin, such procedure being utilized in concert with a toothed conveyor;

FIGS. 6 and 7 reveal cross-sectional views to a still larger scale, illustrating how the tips of the injection means may be perforated;

FIG. 8 is an idealized view showing in detail how my novel injection arrangement causes the root systems of offending plants and weeds to be separated from the bottom and thus be in a position to be carried away by the toothed conveyor arrangement;

FIGS. 9 and 10 represent two different arrangements for treating the removed weeds on the deck of the barge to facilitate disposal;

FIG. 11 reveals an enlarged perspective view of a typical cam arrangement, such as may be used in a timer employed for cycling the fluid injection apparatus;

FIG. 12 reveals in more complete detail a cam arrangement for bringing about a cyclic operation involving a number of components;

FIG. 13 is a diagram representative of a typical cycle involving the fluid pressure injection tubes; and FIG. 14 is a schematic showing of an electrically operated fluid valve.

DETAILED DESCRIPTION

Turning to FIG. 1 it will be noted that I have illustrated a barge 4 arranged to float adjacent the surface 1 of a lake, river or other body of water so that my novel weed removal technique can be carried out. A wheeled device 39 hereinafter referred to as a traveler is arranged to travel along the bottom of the body of water by means of powered wheels 34 and 40. A conveyor is utilized to interconnect the traveler and the barge in a highly advantageous and adjustable manner so that weeds and other marine plants removed in accordance with my novel fluid pressure injection technique can be carried directly to the surface and thereafter disposed of.

The conveyor involves an inclined portion 13 and a horizontally disposed portion 19, which portions are pivoted together at 15. A conveyor chain 17 is arranged to travel around the outer portions of the conveyor, which chain has a plurality of teeth 18 for engaging dislodged plants, as will be seen from a study of FIGS. 3 through 5. A lower portion of the conveyor 13 forms a support for the novel pressure injection arrangement involving injection tubes 26 and 30, which arrangement is discussed in greater detail hereinafter.

In order that the conveyor can be accommodated properly, the front of the barge is deeply slotted, with certain pumping apparatus hereinafter described being located along the forward portions 4a of the barge. As will be noted from FIGS. 1 and 2, the forward or horizontal portion of horizontal conveyor 19 is adjustably supported by a pair of hydraulic actuators 47, with the rear end of device 19 being supported by a rotary shaft 20 disposed upon vertically extending brackets 49 secured to the deck 4b of the barge. The lower end of the conveyor 13 is attached by means of links 37 to traveler 39, the latter being arranged to travel along the bottom 41 of the lake or basin upon pairs of large wheels 34 and 40 powered by driving means 68, as shown in FIG. 2. The driving means can be sealed electric, water hydraulic, or even pneumatic. Preferably, each wheel of the pair of wheels 34, and each wheel of the pair of wheels 40 can be separately driven, so that turns can be executed, at the behost of the operator, by applying power to the wheels on one side of the traveler, and no power, or even braking efforts to the wheels on the opposite side.

The relationship between the traveler and the conveyor can be adjusted by means of a hydraulic actuator 44 on each side of the device, the upper ends of these actuators being supported at points 45 located at the upper end of the frame 39a of the powered underwater vehicle, and the piston rods of which are pinned at 36 to the frame 13 of the lower conveyor; note FIGS. 1 and 2. The upper end of each link 37 is also pinned at 36, with the lower end of each link being pinned at 38 to a front portion of the frame 39a of the traveler. Therefore, as the operator on the barge actuates the cylinders 44 and causes them to change length, the lower end of the inclined conveyor is caused to move with respect to the traveler closer to the lake bottom or away from it as the case may be, thus to adjust the relationship of the teeth 18 to the bottom 41 of the lake. At this time the links 37 pivot about points 38. Another important adjustment is brought about by cylinders 47, the length of which can be adjusted to bring about relative motion at aligned pivot points 15 between the conveyor portions 13 and 19, thus to relieve as much of the conveyor weight from the traveler 39 as may be necessary or desirable to enable the power wheels 34 and 40 to move the entire device forward at the desired speed. The cylinders 47 function much as a spring in their lifting effort, which effort is constant regardless of position.

The active part of the conveyor involves lower wheel or sheave 29, guiding wheel 14, and guiding wheel 46, each of which is attached to the frame 13. The other rotary member is sprocket 21, which is operatively associated with the horizontal conveyor portion, being mounted upon the shaft 20 that is common to the bracket 49 and the frame 19. The sprocket 21 furnishes power to the chain 17, which is disposed around wheel or sheave 29, and then passes over and rests upon wheels 14 and 46. Variable speed motor 48 resting on deck 4b is connected by a chain drive 48a to the shaft 20, thus to supply rotary power to the chain 17 at the speed desired. A comparatively large number of teeth 18 are utilized on the conveyor, and as will be noted from FIG. 2, several teeth 18 extend across the width of the conveyor on cross bars 17a, upon which the teeth are rigidly mounted.

As will be apparent, as the chain is caused to move in a generally clockwise direction in FIG. 1, each group of teeth 18 is caused successively to engage the bottom of the lake or basin, and to lift the weeds, silt and debris to the surface. It will be appreciated that at times the teeth would tend to become tightly lodged with debris, and in order to keep the teeth cleaned, I use a rotary device 23 having a plurality of arms 22. FIG. 2 reveals that these arms interdigitate with the teeth 18, and by virtue of the considerable rotative speed of the arms, they serve to drive the weeds and debris from the teeth into the shredder 51, or other suitable disintegrating device, the lower surface of which is defined by a perforate plate 52. Rotary blade 51a of this device continuously serves to cut up the weeds, with a pump 50 being arranged to deliver these materials via pipe 53 and any desired location. Additional water may be supplied to the shredder by pipe 24. The shredded material can be later delivered to a dump, or alternatively it may be compressed into relatively solid form either by a briquetting procedure as shown in FIG. 9, or by an extrusion procedure as shown in FIG. 10.

WEED UPROOTING APPARATUS

It has been established by many that merely by the use of a rotary toothed arrangement, weeds cannot be satisfactorily and completely removed from the bottom of the lake. Therefore, in accordance with this invention I have provided fluid pressure injection tubes 26 and 30 which, as will be noted from FIGS. 3 through 7, are hollow devices from which water and compressed air can be expelled with considerable force so as to separate the weeds from the lake bottom and move them upwardly so as to be engaged by the moving series of teeth 18.

As will be noted from FIG. 1, the tubes 26 are disposed on a horizontally-extending chamber 27 immediately forward of the lowermost portion of the conveyor, whereas tubes 30 are located rearwardly of the sheave 29, being arrayed on a horizontally-extending chamber 31. For example, four tubes 26 and four tubes 30 may be utilized, but I am of course not to be limited to this number. An air compressor 6 is disposed on each side of the forward portion 4a of the barge, thus to supply compressed air at selected times in the quantities required for the proper operation of the arrangement of tubes 26 and 30. The air compressors 6 are powered by motors 8, but the output from the compressors is not piped directly to the tubes 26 and 30, but rather is metered through an automatic timer 5 so that the compressed air will flow through the tubes 26 and 30 only when they are in the desired relationship to the bottom of the lake. A pair of pipes 2 connect from the timer 5 to a pivotally-constructed manifold arrangement 43a, and thence to the chamber arrangement 27, so that air and water may be respectively delivered to pipes 58 and 56. Latter pipes are clearly depicted in FIGS. 3–5. Similarly, a pair of pipes 3 connect from the timer 5 to pivotally-constructed manifold arrangement 43b, and thence to the chamber arrangement 31, so that air and water may likewise be delivered to the pipes 58 and 56 of this chamber.

It will be appreciated that means are required in order to inject the tubes 26 and 30 into the lake bottom to the desired extent before air and water are caused to flow from the tubes, and to that end I provide a pair of hydraulic cylinders 42 mounted on a forward portion of conveyor 13 and arranged to control the amount of pivotal movement of the manifold or chamber 27 about pivot 43a, and thus the depthwise positioning of the several tubes 26. Similarly, I provide a pair of hydraulic cylinders 35 likewise mounted on conveyor 13 so that by the motion about pivot 43b, the depth that the tubes 30 extend into the lake bottom can also be carefully and adjustably controlled.

During the operation of my device, the tubes 26 and 30 are driven rapidly into and through the marine growth at successive locations, with the ends of the tubes extending below the roots of these plants so that water and thereafter air expelled from the tubes can forcibly drive the weeds upwardly. It should be noted that during the penetration of the tubes through the weed and root structure, water is being forced out of the end openings 87 and 88 of tubes 26, and openings 89 and 90 of tubes 30 to prevent their being plugged up with dirt and silt.

At the start of the downward motion of the tubes 26 and 30, water is supplied by pipes 56 to the chambers 27 and 31, nearly filling these chambers as shown by the height of the fill line 60 in FIG. 3. With this water pressure being supplied to chambers 27 and 31, the tubes 26 and 30 are projected rapidly into and through the marine growths as shown in FIG. 4, ultimately reaching a lowermost position as indicated in FIG. 5, well below the roots and silt in which the plants are embedded. During the tube penetration shown in FIG. 4, the water is being forced through the ends of the tubes as they enter down, through and below the roots, thus explaining the lowered water level 60 in this figure. By the time the tubes have arrived at the position shown in FIG. 5, the water has entirely escaped from the chambers 27 and 31 through the orifices or end openings 87 through 90. Air under pressure is being supplied by pipes 58 to the chambers 27 and 31 while the tubes are in the position in FIG. 4, so that by the time the ends of the tubes 26 and 30 have reached the bottom position shown in FIG. 5, their respective orifices are well below the bottom of the root structure. As the compressed air escapes as a sizable flow 78 from tube 26 and flow 79 from tube 30, a type of air pocket 80 is formed below the roots, lifting the entire marine growth and root structure upward as is indicated in FIG. 5. Then, the entire mass of marine growths 59, including the roots and silt are picked up by the teeth 18 of chain conveyor 17, and carried to the surface. This operation is shown to a somewhat larger scale in FIG. 8.

Returning to a consideration of FIGS. 1 and 2, the pipes 26 and 30 are shown in their lowermost position, which is the position corresponding to FIG. 5. They have arrived at this position having been pushed downward rapidly by actuators 42 and 35. During their downward travel, the conveyor chain 17 is in continuous motion and the traveler 39 on the lake bottom is moving the entire structure forward, or to the left as shown in these figures. This tends to swing the pipes or tubes 26 and 30 backward as indicated by the dotted lines so that they will not obstruct the forward movement of the apparatus. Immediately thereafter, the tubes are withdrawn from the bottom by the operation of actuators 42 and 35 in the opposite direction, and then the tubes are returned to their normal angular positions for the next penetration by cylinders 25 and 32, respectively.

Depending on circumstances, I can program the entire weed removing operation to take place automatically. The timer or timers 5 are arranged to bring about successive implantations of the tubes 26 and 30, as well as release of water and then air each time the tubes have been fully inserted in the bottom of the basin being cleaned. Forward progress of the traveler is geared to coincide with the tube implantation schedule, and may also be controlled by the timer 5. The operator on the barge observes from his seat 69 the condition of the material being removed from the lake or river bottom, and by the use of controls 71 makes changes in the timer setting or conveyor chain position as may be necessary.

Turning to FIG. 11, it will be noted that I have illustrated a fragmentary perspective view of a typical timer arrangement of the type that may be used at location 5 in FIGS. 1 and 2 in order that the tubes 26 and 30 will be implanted and removed in the desired sequence, and at a rate of speed consonant with the movement of the traveler along the bottom of the basin of water. This device also typically controls the timing with regard to the release of water and air from tubes 26 and 30.

In FIG. 11, I have displayed an exemplary cam array 61, involving for example cams 62, 64 and 66 mounted upon a common rotative shaft 85, with each of these cams being associated with an electric switch, such as a Microswitch 72, 74 and 76, respectively. These three cams are equipped with lobes 63, 65 and 67, with the respective microswitches having actuator arms or cam followers 73, 75 and 77, respectively.

As will be apparent to those skilled in the art, the main portions of the microswitches are rigidly attached, whereas the movable arm portions may move up and down against a spring bias during the procedure of following the lobes. It will be noted in FIG. 11 that microswitch 72 is in the process of being actuated by cam lobe 63, thus accounting for the plunger portion of this switch being shown in its inward position. In contrast, the plunger portions of switches 74 and 76 are in the outward or non-actuated position. It will of course be understood that the relative rotative positions of the cams can be adjusted by merely loosening and then retightening set screws that bear upon the shaft.

It is to be understood that the three cams 62, 64 and 66 are merely illustrative, and a considerably larger number of cams may be used on each rotative shaft in order that a number of functions such as tube insertion, water release, and air release may be sequentially controlled.

Quite obviously, the timing sequence that is desired can be established by the careful rotative positioning of the cams on the common shaft, so that, for example, the sequence diagram shown in FIG. 13 can be carried out. In this instance, a first cam causes a switch to close that in turn brings about an actuation of the mechanism responsible for causing the tubes 26 (or tubes 30) to be inserted in the lake bottom; another switch is closed to turn on the water to the tubes, and another switch to turn on the air. The length of the respective cam lobes can determine the length of time that is involved in each operation, or a separate cam may be used to turn off a flow for example. In this particular instance, the air may be turned on for a somewhat greater length of time than the water.

The admission of these fluids may be controlled by the energization of solenoid controlled type valves, such as illustrated in FIG. 14. In this figure, valve 91 may have a handle 92, to which is connected an armature 93. A solenoid type coil 94, when energized, causes the armature to move to the illustrated position to turn on the water or air as the case may be, which then flows through pipe 96. The return of the handle to the closed position may be as a result of a spring bias in that direction, which functions as soon as the cam follower drops off its lobe, or the closing of the valve may occur as a result of a different cam closing a different switch, that in turn causes the energization of coil 95.

FIG. 12 reveals a cam arrangement in which an electric motor 81 drives a gear 82 that is in mesh with large gears 83 and 84. The rotation of gear 83 in turn causes the rotation of shaft 85 on which is mounted the aforementioned cams 62, 64 and 66. It will be understood that there will be as many electric switches as there are cams, so that a variety of functions can be carried out in sequential relation.

In the preferred instance, one pair of cams can be used to control the operation of the tube plungers; another pair for the control of the water, and still another for the admission of compressed air. A seventh cam on shaft 85 provides for opening an electric circuit in parallel with the plunger contact. Unless at least one of these contacts is closed, there will be an open or broken circuit which can be used to operate an alarm, or shut down all or part of a circuit.

The shaft 86 and its associated cams is used if the tubes 26 and the tubes 30 are to be operated by a common timing arrangement, which may be preferable. Alternatively, the arrangement depicted in FIGS. 1 and 2 may be utilized, in which a timer 5 on the starboard side of the barge is used to control say the tubes 26, and a timer 5 on the port side is used to control the functions associated with the tubes 30. This latter scheme would of course be the one used if the tubes 26 were to be implanted at a different operating rate than the tubes 30.

As will be understood by those skilled in the art, the opening and closing of the electric switches associated with the cams of the timer arrangement determines the precise manner in which high pressure hydraulic fluid is ported to the actuators 35, 42, 32 and 25, thus to bring about the sequences described above. The source of the hydraulic fluid can of course be an engine-driven hydraulic pump disposed on the deck 4b.

Control over the direction of movement of my apparatus is made possible by selective manipulation of the power units 68, so that the wheels on one side of the traveler can be caused to move faster than on the other side. Direction controls 70 for use by the operator are shown in FIG. 2.

While my method and apparatus have particular application to Florida lakes and rivers, it is to be understood that they have wide application to areas where troublesome marine growth is present.

Having thusly described my invention, what I claim is:

1. Apparatus for removing marine growths from the bottom of a water covered basin which comprises a plurality of open end tubes, means for supporting said tubes for movement toward and away from the basin bottom, means for forcing the tubes into and through the growths, and means for injecting water and subsequently air from the open ends of each of said tubes.

2. Apparatus for removing marine growths from the bottom of a basin of water, comprising a powered vehicle arranged to travel along the bottom of the basin of water, and fluid pressure injection means disposed upon said vehicle and arranged to inject fluid under pressure directly below and into the root systems of such marine growths, said injection means including a plurality of hollow tubes movable with respect to said vehicle so as to penetrate into the bottom of the basin, water under pressure and subsequently compressed air are injected through each of said tubes below and into the root systems of the marine growths, the injected fluid causing the uprooting of such growths.

3. The apparatus as defined in claim 2 in which marine growth removal means is operatively disposed adjacent said fluid pressure injection means, said removal means functioning to deliver the uprooted growths to the surface of the water for disposal.

4. The apparatus as defined in claim 2 in which a conveyor arrangement partially supported by said powered vehicle is utilized for removing the uprooted marine growth, the lower end of said conveyor arrangement being disposed adjacent said fluid pressure injection means, and the upper end of said conveyor arrangement being supported by a floating barge disposed to receive the uprooted marine growth, and means for adjusting the relationship between said powered vehicle and said conveyor, thus to enable a desirable amount of conveyor weight to be borne by said powered vehicle, and to enable the lower end of said conveyor to be positioned in the optimum relationship to said fluid pressure injection means.

5. Apparatus for removing marine growths comprising a powered traveler arranged to move along the bottom of a water covered basin on which bottom marine growth is present, said traveler having mounted thereon a plurality of tubes, means for reciprocating said tubes into and out of said bottom, means for injecting water and subsequently air from the lower end of each of said tubes at such time as said tubes are penetrating into the bottom to force the growth away from the bottom, timer means for programming water and air injection and tube reciprocation, and conveyor means for removing the separated growth from the water.

6. Apparatus for removing marine growths which comprises a power driven traveler designed to move along the bottom of a water covered basin, on which bottom, plants are growing, means on said traveler for uprooting such plants, said means including a plurality of hollow tubes for penetrating into the bottom of the basin, through each of which tubes, water and then air are injected, both through and below the root systems of the plants, a floating barge movable over the water surface, and conveyor means connecting said traveler with said barge, said conveyor means being adjustably positionable with respect to the bottom of the basin and functioning to deposit on said barge those plants uprooted by said traveler.

7. Apparatus for removing marine growths from the bottom of a lake comprising a power driven traveler moving over the marine growth area and connected by means of a conveyor to a floating barge, said conveyor having an inclined section and a relatively horizontal conveyor section, one end of said inclined section being connected to and supported by said traveler, and the other end of said inclined section being pivotedly connected to one end of said horizontal section, with the other end of said horizontal section being supported by and fixed to said barge, means on said traveler for uprooting marine growths, latter means including a plurality of tubes through which water and then air are injected both through and below the root systems of such marine growths, said conveyor then functioning to deposit such growths upon said barge.

8. The apparatus as defined in claim 7 in which means are provided for selectively varying the proportion of the conveyor weight borne by said traveler.

9. Apparatus for removing marine growths which comprises a power driven traveler movable over the bottom of a water filled basin along which is located marine growth, reciprocating open end tubes mounted on said traveler, means to reciprocate said tubes into and out of said bottom, means to supply water and subsequently air to each of said tubes in timed relation to said reciprocating motion to cause an uprooting of such growth, a floating barge, conveyor means extending from said traveler to the deck of said barge, with the lower end of the conveyor in proximity to said reciprocating tubes, for transporting uprooted growth to the deck of said barge.

10. The apparatus as defined in claim 9 in which timer means are utilized for bringing about the timed operation of reciprocating said tubes and causing water and air to be injected through said tubes, as well as subsequent repetition of such operation.

* * * * *